United States Patent [19]

Endo

[11] Patent Number: 5,428,592
[45] Date of Patent: Jun. 27, 1995

[54] REPRODUCING SYSTEM OF A MULTI-TYPE CD PLAYER

[75] Inventor: Fumio Endo, Saitama, Japan

[73] Assignee: Pioneer Electronic Corporation, Tokyo, Japan

[21] Appl. No.: 161,514

[22] Filed: Dec. 6, 1993

[30] Foreign Application Priority Data

Dec. 9, 1992 [JP] Japan .................. 4-352084

[51] Int. Cl.⁶ .............................. G11B 7/00
[52] U.S. Cl. ........................ 369/48; 369/58; 369/124
[58] Field of Search ............... 369/47–48, 369/54, 58, 111, 124

[56] References Cited

U.S. PATENT DOCUMENTS 5,257,253 10/1993 Otsubo et al. .............. 369/58 X

Primary Examiner—W. R. Young
Attorney, Agent, or Firm—Nikaido, Marmelstein, Murray & Oram

[57] ABSTRACT

A decoder is provided for decoding a sub-code recorded in a predetermined area of each of a CD and a CD-ROM. The CD and CD-ROM are discriminated based on the decoded sub-code. When CD-ROM is discriminated, an output signal of a pickup is prevented from being reproduced.

2 Claims, 5 Drawing Sheets

REPRODUCING SYSTEM OF A MULTI-TYPE CD PLAYER

BACKGROUND OF THE INVENTION

The present invention relates to a multi-type CD player which can reproduce various types of discs such as a compact disc (CD) and a CD-ROM.

FIG. 5 shows a conventional multi-type CD player.

A disc 1 is secured to a spindle of a motor 13 to be rotated by the motor.

A pickup head 2 reads out the recording surface of the disc 1 and produces a reproduced RF signal which is supplied to an RF amplifier 3. In the RF amplifier 3, the RF signal is amplified and the amplified signal is supplied to a signal processor 6 for decoding the signal. The decoded signal is supplied to a DAC 7 where the signal is converted into an analog signal to produce an audio signal through a muting circuit 9.

The RF amplifier 3 further produces focus and tracking error signals which is applied to a driver 4. The driver 4 controls focusing and tracking operations of the pickup head 2 based on the error signals through a servomechanism 5.

The signal processor 6 produces a signal based on a sub-code recorded on a TOC (table of content) area of the disc 1. The signal is applied to a controller 10 for controlling the motor 13 through a spindle servo 12.

When a CD is reproduced, the controller 10 discriminates the CD based on a sub-code recorded on a TOC area of the CD decoded at the signal processor 6 to turn off the muting circuit 9.

When a CD-ROM is reproduced, the controller 10 discriminates the CD-ROM from the CD based on a sub-code recorded on a TOC area of the CD-ROM decoded at the signal processor 6. The controller 10 controls a display of a display-operation section 11 based on a control data for a computer.

The reproduced signal of the CD-ROM is higher than 20 kHz. If such a high frequency signal is output through the DAC 7, it causes noises. Therefore, when the CD-ROM is discriminated, the controller 10 controls to turn on the muting circuit 9 so as to reduce the noises.

However, if a muting characteristic of the muting circuit 9 is low, the noises are not sufficiently reduced. Accordingly, when the CD-ROM is reproduced and even if the muting circuit 9 is turned on, the signal may be produced as noises because of insufficient muting operation.

SUMMARY OF THE INVENTION

An object of the present invention is to provide a multi-type CD player in which noises caused by a high audio frequency in the reproduced signal of the CD-ROM is completely prevented.

According to the present invention, there is provided a reproducing system of a multi-type CD player having a pickup for reading a compact disc and another disc, comprising: decoder means for decoding a sub-code recorded in a predetermined area of each of the discs; discriminating means for discriminating the compact disc and the other disc based on the decoded sub-code; preventing means for preventing an output signal of the pickup from being reproduced in response to a discrimination of the other disc.

The preventing means is a switch for cutting of the output signed of the pickup, and the other disc is a CD-ROM.

The other objects and features of this invention will become understood from the following description with reference to the accompanying drawings.

DETAILED DESCRIPTION OF THE PREFERRED EMBODIMENT

Figure 1:
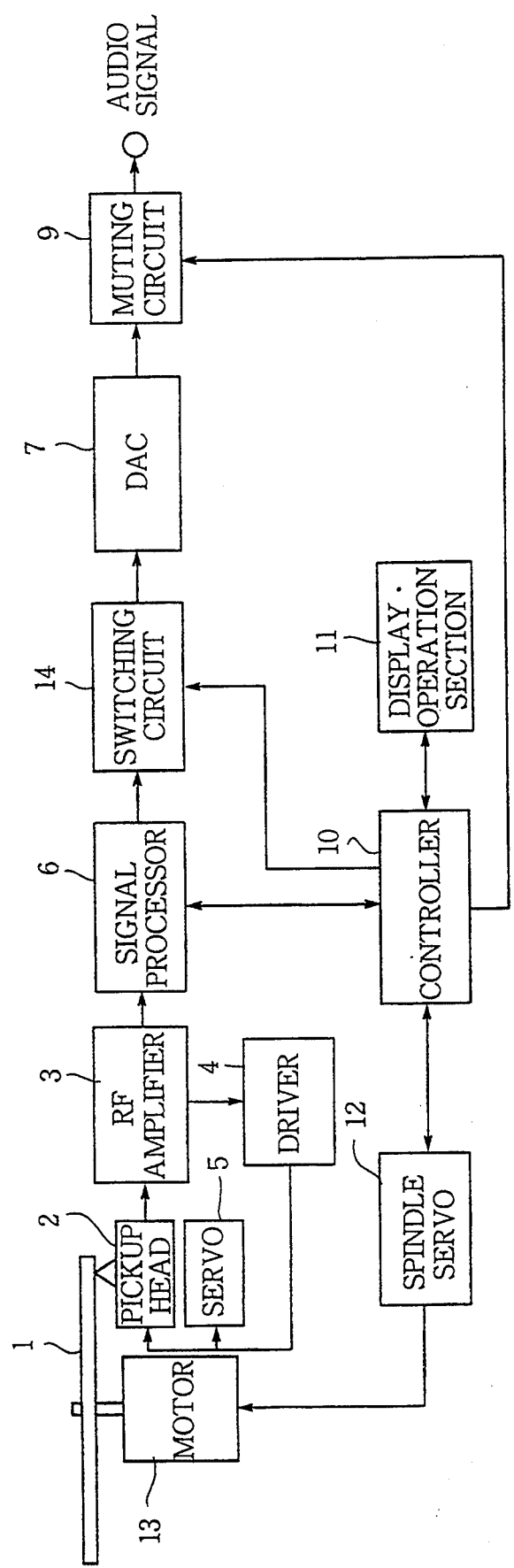
FIG. 1 is a block diagram showing a multi-type CD player according to the present invention.

Referring to FIG. 1, a reproducing system of a multi-type CD player according to the present invention has a switching circuit 14 provided between the signal processor 6 and the DAC 7. The switching circuit 14 is controlled by a signal from the controller 10.

Figure 5:
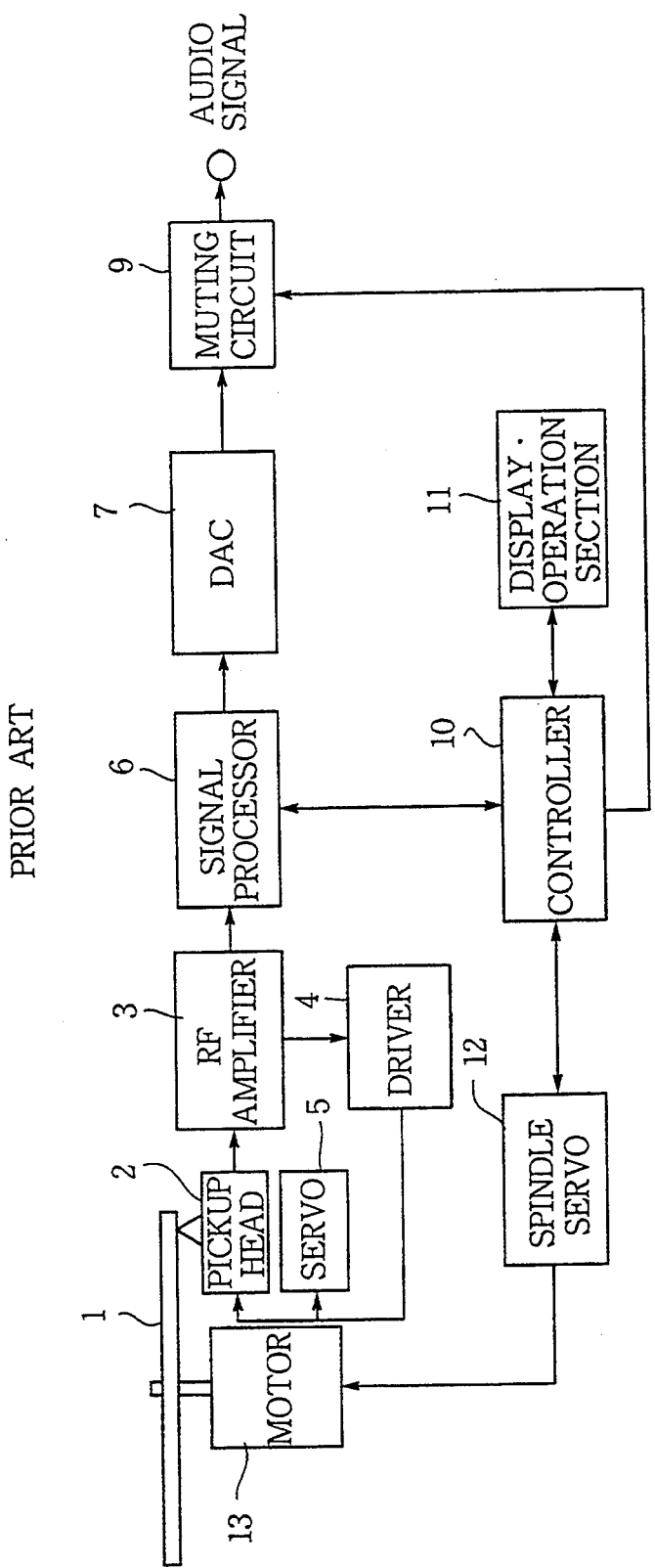
FIG. 5 is a block diagram showing a conventional multi-type CD player.

Other structures are the same as the conventional CD player and the same parts thereof are identified with the same reference numerals as FIG. 5.

Figure 2:
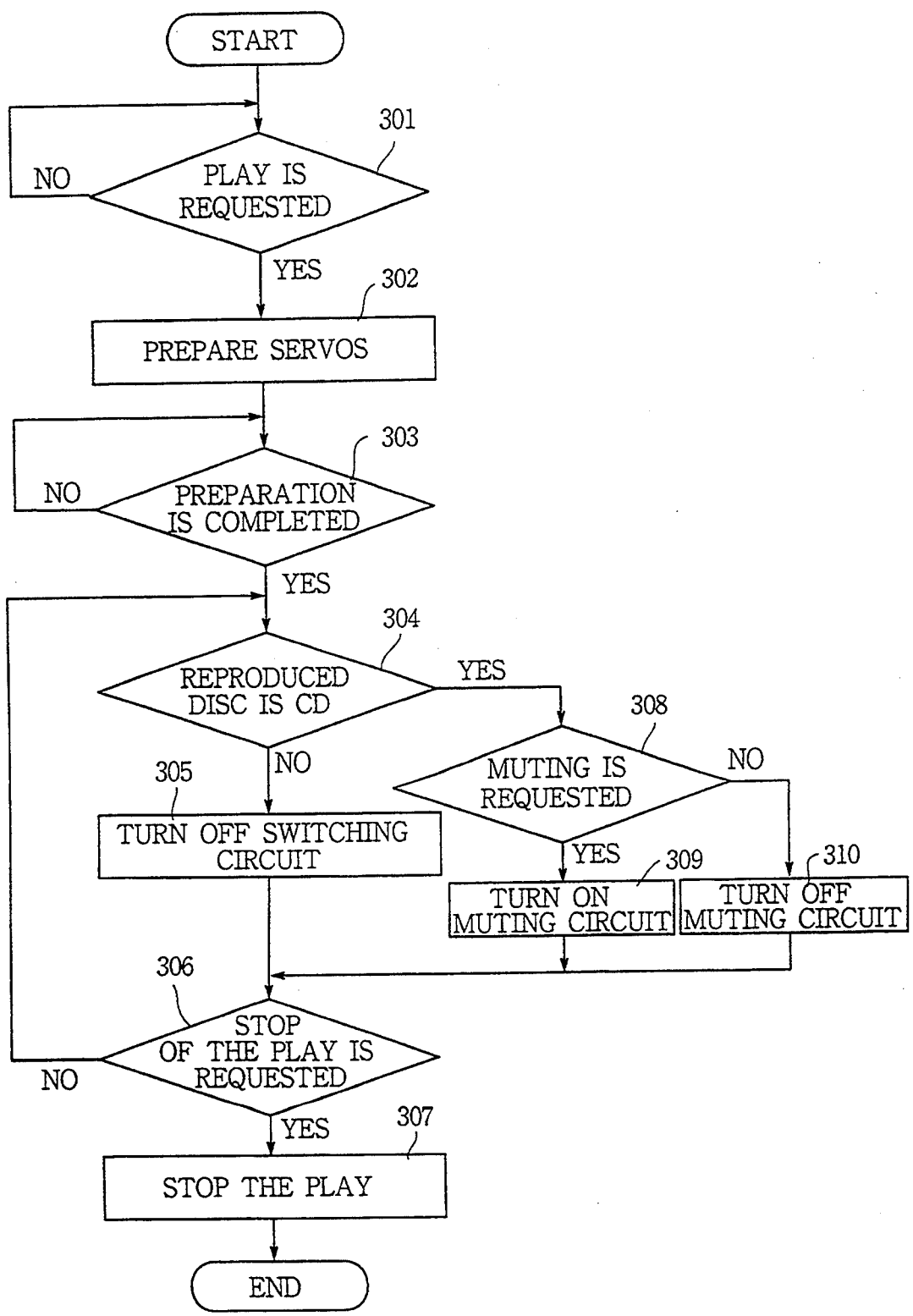
FIG. 2 is a flowchart showing an operation of the player.

The operation of the reproducing system will be described with reference to the flowchart of FIG. 2.

If the play of the disc 1 is requested at a step 301, the servos are prepared to be operated at a step 302 and it is determined whether the preparations are completed at a step 303. At a step 304, the type of the reproduced disc is discriminated by the controller 10 based on the sub-code decoded at the signal processor 6. If the CD is discriminated, the switching circuit 14 is turned on and the program goes to a step 308. It is determined whether the display.operation section 11 is operated in order to mute the sound during dubbing a tape or to lower the volume of a speaker at a moment. If the muting operation is requested, the program goes to a step 309 where the muting circuit 9 is turned on by the control signal of the controller 10. Thus, the audio signal is muted to a predetermined level. If the muting operation is not requested at the step 308, the program goes to a step 310 where muting circuit 9 is maintained in an off-state.

At the step 304, if it is determined that the reproduced disc is not the CD, namely the CD-ROM is discriminated, the program goes to a step 305 where the switching circuit 14 is turned off. Thus, the reproduced signal of the CD-ROM to the DAC 7 is cut off, and noises are prevented from producing.

At a step 306, it is determined whether it is requested to stop the play or not. If yes, the program goes to a step 307 where the play of the disc is stopped. If not, the program returns to the step 304.

In accordance with the present invention, the controller discriminates between the CD and the CD-ROM based on sub-code. When the CD-ROM is reproduced, the signal to the DAC is cut off by turning off the switching circuit. Thus, noises are completely prevented.

Figure 3:
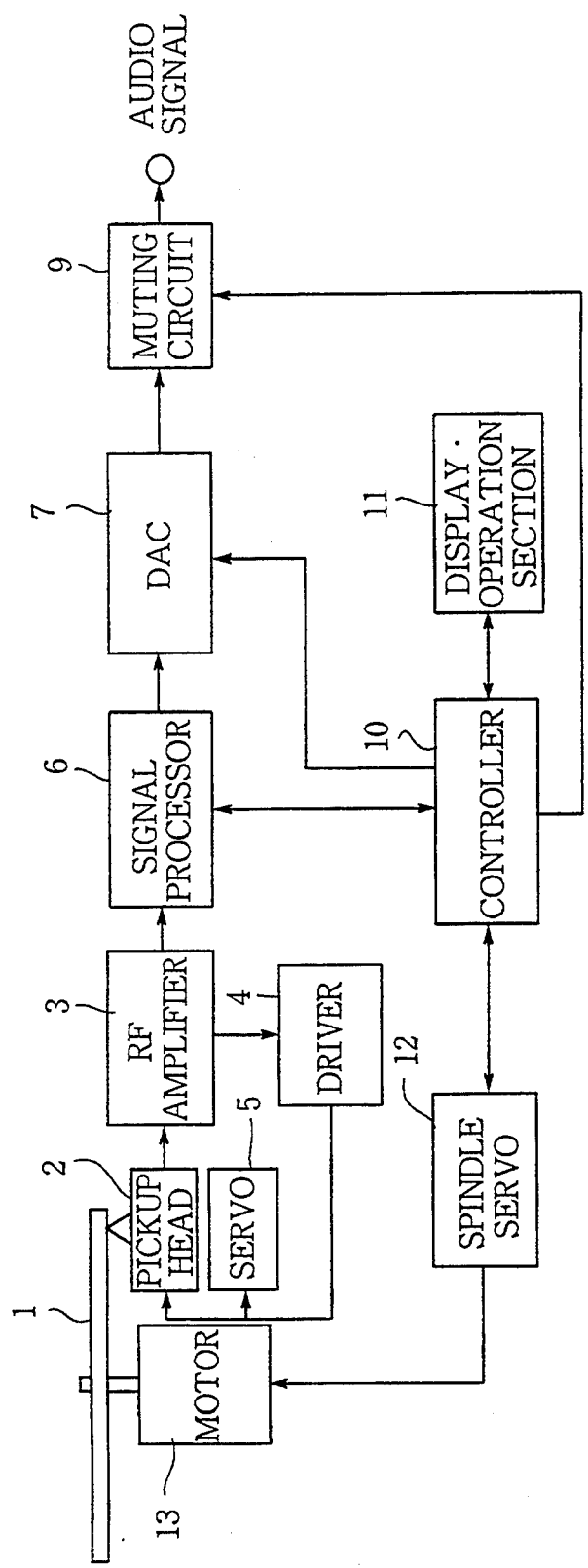
FIG. 3 is a block diagram showing another embodiment of the present invention.

FIG. 3 shows another embodiment of the multi-type CD player. The DAC 7 is provided with a muting device having a high muting characteristic. In operation, when the CD-ROM is discriminated by the controller 10, the controller operates to turn on the muting device in the DAC 7 as well as the muting circuit 9.

In the embodiment, it is possible to compensate the lack of the muting characteristic of the muting circuit 9 with the muting device in the DAC 7.

Figure 4:
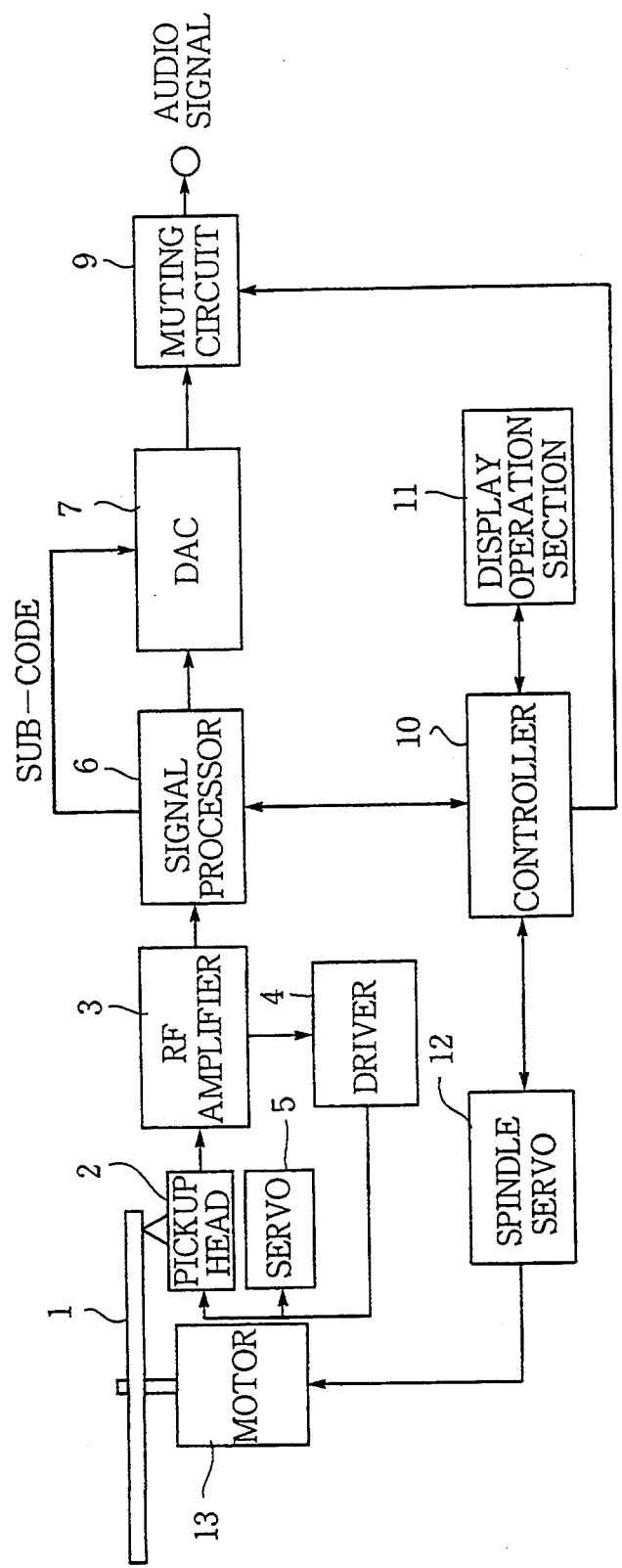
FIG. 4 is a block diagram showing a further embodiment.

FIG. 4 shows a further embodiment. The sub-code of the signal processor 6 is applied to the DAC 7. When receiving the sub-code, the DAC 7 operates to turn on the muting device provided therein.

Thus, a controlling load on the controller 10 is reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A reproducing system of a multi-type CD player having a pickup for reading a compact disc and another disc, an amplifier for an RF signal, and a muting circuit for reducing noises caused by an output signal of the amplifier, said reproducing system comprising:

decoder means for decoding a sub-code recorded in a predetermined area of each of the discs;

discriminating means for discriminating the compact disc and the other disc based on the decoded sub-code;

a switch for cutting off the output signal to be applied to the muting circuit in response to a discrimination of the other disc.

2. The system according to claim 1 wherein the other disc is a CD-ROM.

* * * * *